United States Patent
Mader

(10) Patent No.: US 9,301,643 B2
(45) Date of Patent: Apr. 5, 2016

(54) LID FOR A COOKING VESSEL

(71) Applicant: Zwilling J.A. Henckels AG, Solingen (DE)

(72) Inventor: Sebastian Mader, Hilden (DE)

(73) Assignee: Zwilling J.A. Henckels AG (DE)

( * ) Notice: Subject to any disclaimer, the term of this patent is extended or adjusted under 35 U.S.C. 154(b) by 142 days.

(21) Appl. No.: 13/970,781

(22) Filed: Aug. 20, 2013

(65) Prior Publication Data

US 2014/0053824 A1    Feb. 27, 2014

(30) Foreign Application Priority Data

Aug. 20, 2012 (DE) .......................... 10 2012 016 525

(51) Int. Cl.
  *A47J 36/06* (2006.01)
  *A47J 36/08* (2006.01)
  *A47J 37/10* (2006.01)

(52) U.S. Cl.
  CPC ................ *A47J 36/08* (2013.01); *A47J 37/101* (2013.01)

(58) Field of Classification Search
  CPC ..................................................... A47J 36/08
  USPC ..................... 126/380.1, 384.1, 386.1, 389.1
  See application file for complete search history.

(56) References Cited

U.S. PATENT DOCUMENTS

| | | | |
|---|---|---|---|
| 1,413,579 A | | 4/1922 | Gill |
| 1,414,540 A | * | 5/1922 | Young et al. ............... 126/384.1 |
| 2,348,452 A | | 5/1944 | Christopher |
| 2,590,942 A | | 4/1952 | Cornelius |
| 2,643,024 A | * | 6/1953 | Cronheim .................. 220/367.1 |
| 2,760,672 A | * | 8/1956 | Cronheim ..................... 220/287 |
| 3,141,455 A | | 7/1964 | Dumbeck |
| 3,465,745 A | * | 9/1969 | Butler ......................... 126/384.1 |
| 3,780,642 A | * | 12/1973 | Bay ......................... A47J 36/06 126/381.1 |
| 4,482,077 A | * | 11/1984 | Henderson .................... 220/374 |
| 6,846,504 B1 | * | 1/2005 | Yarnell ......................... 426/523 |

OTHER PUBLICATIONS

European Search Report of European Patent App. No. 13004043.9-1656 dated Sep. 19, 2013.
Search Report of German Application No. 10 2012 016 525.0, dated Jul. 17, 2013.

* cited by examiner

*Primary Examiner* — Avinash Savani
(74) *Attorney, Agent, or Firm* — Mayback & Hoffman, P.A.; Gregory L. Mayback; Rebecca A. Tie

(57) ABSTRACT

A lid for a cooking vessel, in particular, of a cooking pot includes a plurality of shaped elements projecting downwards at the underside of the lid. The shaped elements are flat or curved concavely and respectively form a planar lower surface that accumulates condensate, is enclosed in a U-shaped manner, slopes towards the edge of the lid, and leads to a drip off edge at its lowest location.

20 Claims, 4 Drawing Sheets

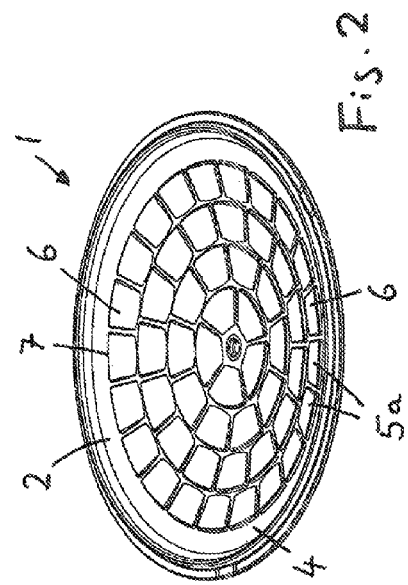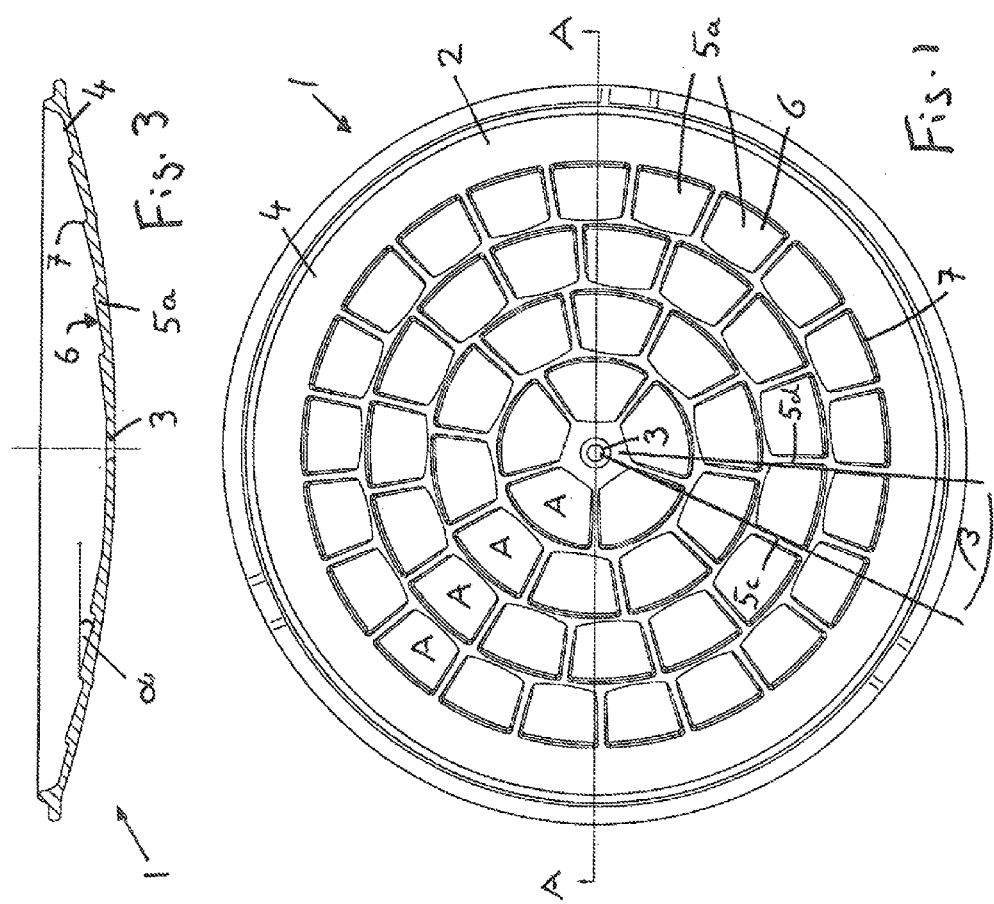

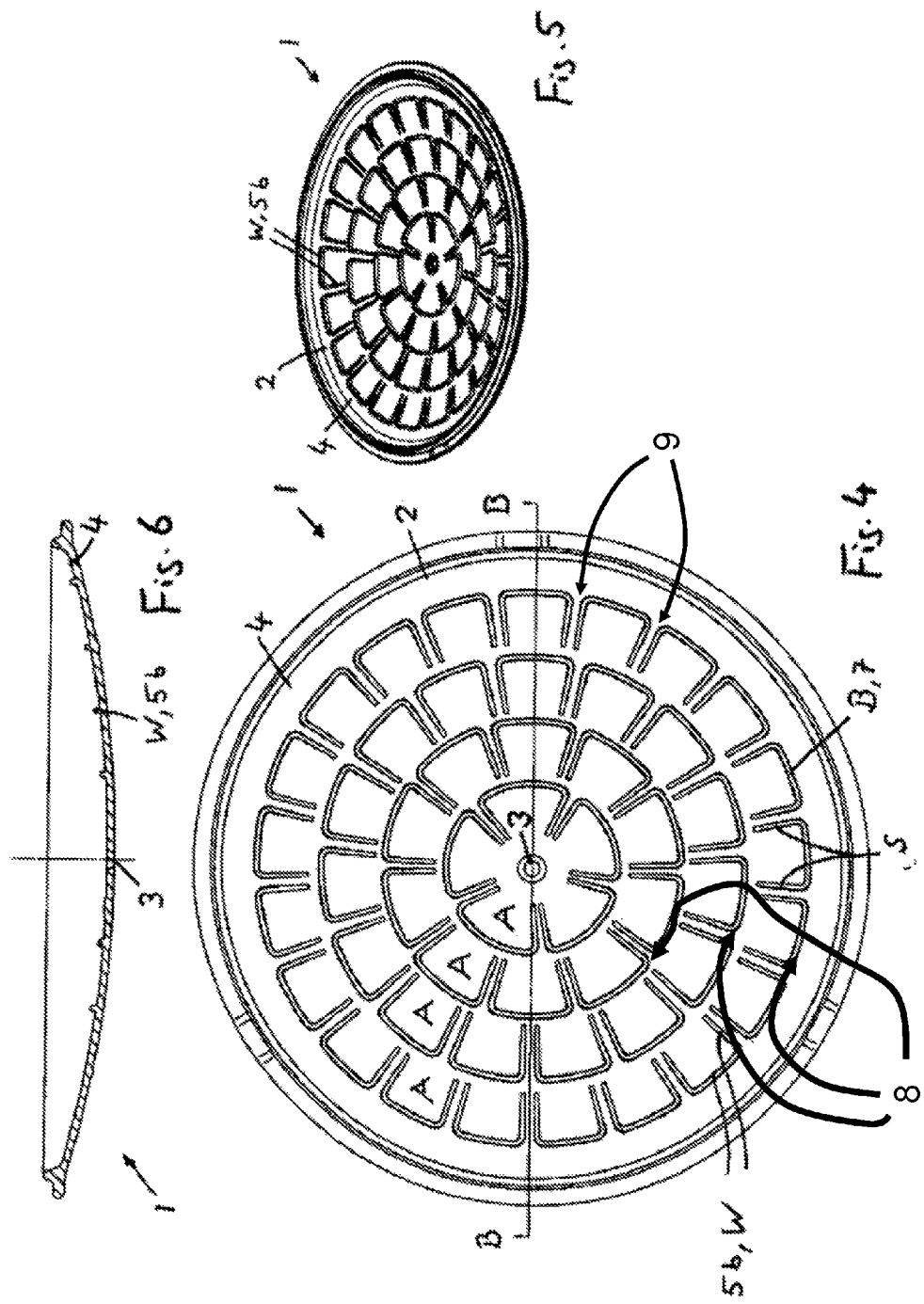

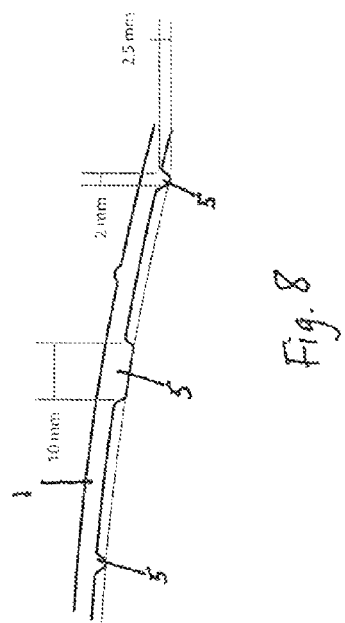
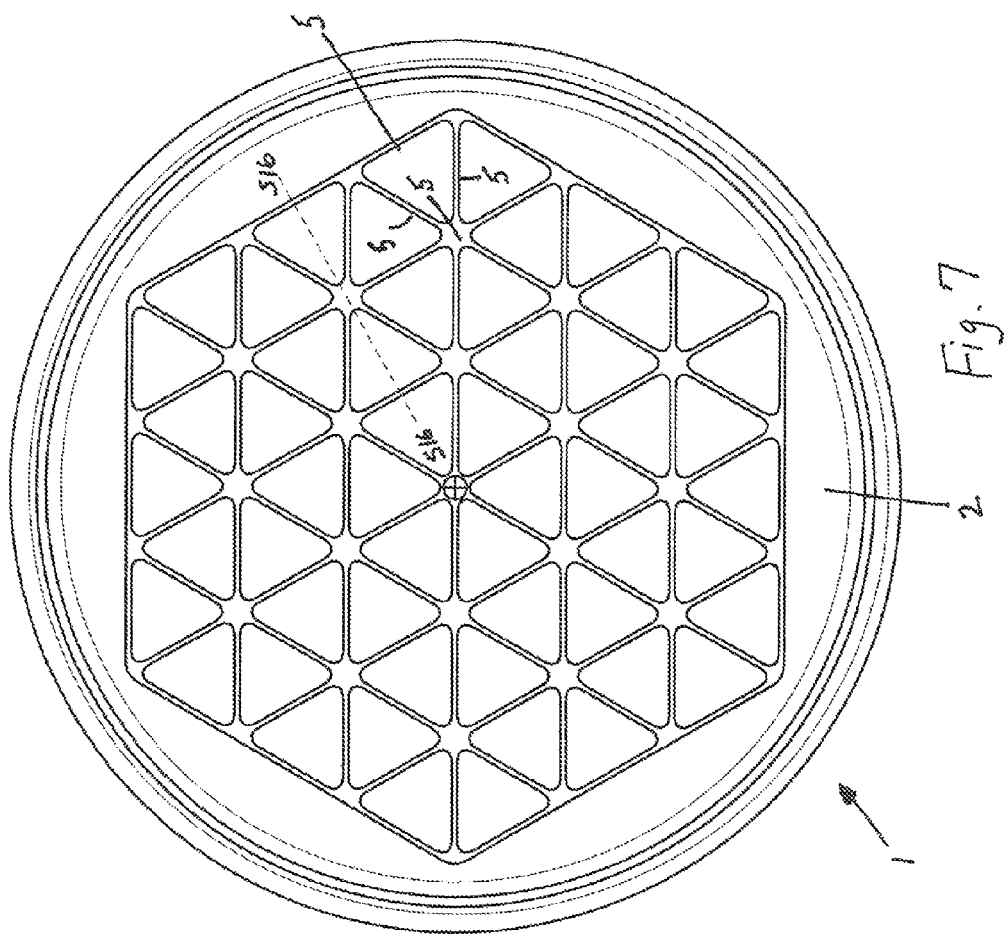

LID FOR A COOKING VESSEL

CROSS-REFERENCE TO RELATED APPLICATIONS

This application claims the benefit of priority under 35 U.S.C. §§119 and 371, of German Patent Application No. 10 2012 016 525.0, filed on Aug. 20, 2012; the prior application is herewith incorporated by reference in its entirety.

STATEMENT REGARDING FEDERALLY SPONSORED RESEARCH OR DEVELOPMENT

Not Applicable

FIELD OF THE INVENTION

The present invention relates to a lid for a cooking vessel, in particular, of a cooking pot.

BACKGROUND OF THE INVENTION

For many dishes (e.g., roasts) that are prepared in a cooking vessel, it is important to prevent them from drying out during the cooking process. The closing of the cooking vessel with a lid makes it possible to limit the release of moisture into the environment. Moisture condenses at the underside of the lid and drops form. In the case of a curved lid, the condensate runs along the lid curvature, until it meets the edge of the lid. From there, it drips off or it moves downwards along the wall of the pot. In the case of slightly curved or flat lids, the condensate drips off randomly. In both cases, the food is wetted in an uncontrolled and irregular manner with regard to location and quantity of the condensate.

Thus, a need exists to overcome the problems with the prior art systems, designs, and processes as discussed above.

SUMMARY OF THE INVENTION

The invention provides a lid for a cooking vessel that overcomes the hereinafore-mentioned disadvantages of the heretofore-known devices and methods of this general type and that provide such features such that the condensate, which accumulates at the underside of the lid, drips onto the food to be distributed evenly.

With the foregoing and other objects in view, there is provided, in accordance with the invention, a lid for a cooking vessel includes a lid base having an edge and an underside with a plurality of shaped elements. Each of the plurality of shaped elements projects downwards from the underside, is flat or concavely curved, has a lowest location at which is a drip off edge, and respectively forms a planar lower surface that accumulates condensate, that is enclosed in a U-shaped manner, that slopes towards the edge of the lid, and that leads to the drip off edge. The lid can be a cooking pot lid.

According to the invention, this task is solved in that a plurality of shaped elements projects downwards at the underside of the lid, which is curved inwards, with said shaped elements in each case forming an in particular plane lower surface, which accumulates condensate and which is enclosed in a U-shaped manner and which slopes towards the edge of the lid and which leads to a drip off edge at its lowest location.

Such shaped elements can be distributed evenly across the underside of the lid such that the condensate, which forms from the water vapor at the underside of the lid, drips off so as to be distributed evenly across the food and thus wets the food evenly. The condensate thus no longer drips off from the underside of the lid in a disorganized manner and also no longer flows to the edge of the lid, so as to drip off at that location.

It is important hereby that the shaped elements and in particular the drip off edges and/or drip off tips thereof are distributed evenly across the lower surface of the lid.

The shaped elements either from surfaces, which project downwardly in a stepped manner or beads, which are curved in a U-shaped manner, which define the lower surfaces, which accumulates condensate.

An advantageous, particularly even distribution is attained when the shaped elements are arranged at equal intervals in rows on concentric circular rings. For this purpose, it is also proposed that all or at least the plurality of the shaped element encompass an equal, plane lower surface, which accumulates condensate. Preferably, it is proposed that the lower surface encompasses an incline of $\alpha=5$ to 40 degrees.

In accordance with another feature of the invention, the shaped elements are distributed evenly about the underside of the lid.

In accordance with a further feature of the invention, the drip off edges of the shaped elements are distributed evenly about the underside of the lid.

In accordance with an added feature of the invention, the shaped elements are disposed at equal intervals in rows on concentric circular rings.

In accordance with an additional feature of the invention, the lower drip off edge of the shaped elements are located on concentric circles of the underside of the lid.

In accordance with yet another feature of the invention, the lid base has a center and the shaped elements have a wedge-shaped cross-section increasing from the center of the lid base radially outwards.

In accordance with yet a further feature of the invention, at least the plurality of the shaped elements form or border a lower surface of substantially equal size and the lower surface accumulates condensate.

In accordance with yet an added feature of the invention, the shaped elements are beads curved in a U-shaped and defining the lower surface that accumulates condensate.

In accordance with yet an additional feature of the invention, the beads encompass a substantially equal cross-section across their length.

In accordance with again another feature of the invention, the lower surface encompasses an incline of between approximately 5 degrees to approximately 40 degrees, in particular, between approximately 10 degrees to approximately 20 degrees.

In accordance with again a further feature of the invention, the lower surfaces of all of the shaped elements have the same angle of inclination or a different angle of inclination.

In accordance with again an added feature of the invention, the lower surfaces encompass the shape of at least one of a wedge, a circular sector, and a circular ring sector comprising an acute interior angle.

In accordance with again an additional feature of the invention, bisecting axes of one of the wedge-shaped lower surfaces and the circular sector-shaped lower surfaces are radially disposed.

In accordance with still another feature of the invention, the one of the wedge-shaped lower surfaces and the circular sector-shaped lower surfaces overlap one another.

In accordance with still a further feature of the invention, the lower surfaces have tips and the tips are covered by another of the lower surfaces located higher on the underside of the lid.

In accordance with a concomitant feature of the invention, the lid base is of cast iron, steel, glass, or a combination thereof. At least the underside of the lid can have an enamel layer.

Although the invention is illustrated and described herein as embodied in a lid for a cooking vessel it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 1 is a bottom plan view of a first exemplary embodiment of a cooking vessel lid according to the invention;

FIG. 2 is a perspective view of the underside of the lid of FIG. 1;

FIG. 3 is a cross-sectional view of the lid of FIG. 1 along section line A-A in FIG. 1;

FIG. 4 is bottom plan view of a first exemplary embodiment of a cooking vessel lid comprising U-shaped shaped elements according to the invention;

FIG. 5 is a perspective view of the underside of the lid of FIG. 4;

FIG. 6 is a cross-sectional view of the lid of FIG. 1 along section line B-B in FIG. 4;

FIG. 7 is a bottom plan view of a third exemplary embodiment of a cooking vessel lid comprising triangular shaped elements according to the invention;

FIG. 8 is a fragmentary, cross-sectional view of a portion of the lid of FIG. 7 along section line S16-S16 in FIG. 7;

DETAILED DESCRIPTION OF THE INVENTION

Figure 10:
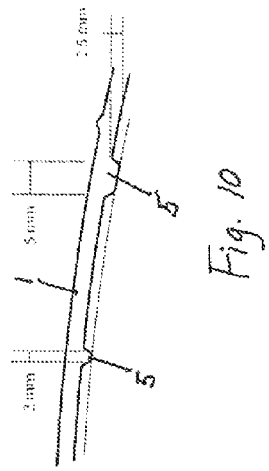
FIG. 10 is a fragmentary, cross-sectional view of a portion of the lid of FIG. 9 along section line S18-S18 in FIG. 9.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 1, there is shown a first exemplary embodiment of a lid 1 of a cooking vessel, in particular of a cooking pot, which in an exemplary embodiment is of cast iron is curved so that it encompasses a convex upper side and an underside 2, which is curved inwards and which is thus concave. The underside is highest in its center 3 and slopes towards the edge 4, which is circular in the exemplary embodiment. When the lid 1 is attached to a cooking vessel, in particular, a cooking pot, the condensate formed by water vapor at the underside 2 of the lid condenses as droplets, which come together to form larger drops and which would either drip down onto the food in an irregular manner or which would run towards the edge of the lid.

To prevent this, a plurality of shaped elements 5a, which project downwards and which respectively encompass a lower surface 6, which is planar but which slopes towards the edge of the lid 1, on its underside, is integrally molded to the underside 2 of the lid 1 in accordance with FIGS. 1 to 3. The lower surfaces 6 of all of the shaped elements 5 hereby have an angle of inclination α comprising a horizontal. This angle of inclination is α=about 5 to 40 degrees, for example and, in particular, about 10 to 20 degrees. The angle of inclination α of all of the lower surfaces 6 is equal or increases towards the edge of the lid. Even in the case of a different shape, the lower surfaces 6 of all of the shaped elements are substantially equal (surface A), so that approximately an equal amount of condensate accumulates underneath each shaped element and drips off steadily at approximately equal intervals.

In the exemplary embodiment of the lid illustrated in FIGS. 4 to 6, the shaped elements 5b form beads W. These beads W are U-shaped and define the lower surface 6, which accumulates condensate, on three sides. The base B of the U-bead W is respectively located on a concentric circular ring 8 (here, three in number) and forms the lowest location of the bead W, so that the base B forms a drip off edge 7 and the U-legs S are oriented inwards towards the center (middle) of the lid. In the exemplary embodiment shown, the beads W have a substantially equal cross-section across their length.

In addition, the shaped elements 5a, 5b, which are disposed radially and in a stepped manner, are configured so that the lower surfaces 6 thereof are distributed evenly across the underside 2 of the lid 2. On the lower end, and thus at its lowest positions, each lower surface or the base of the U-shape, respectively, has a drip off edge 7 or one or a plurality of drip off tips, towards which the droplets of a lower surface run, so as to drip onto the food as large drops at that location. The radial intervals of the drip off edges 7 and/or drip off tips from one another are thus equal. These measures ensure that the condensate drips onto the food in a way that is distributed evenly locally.

The shaped elements 5a, 5b are located on circular rings, which are concentric to one another and into which the underside 2 of the lid is divided, so that the lower surfaces 6 divide the circular rings to be located closely to one another. Only narrow, radial, groove-shaped gaps 9 remain between the shaped elements. Through this, the innermost or central lower surfaces 6, respectively, have the shape of a circular sector and the remaining lower surfaces 6, which divide the circular rings, have the shape of circular ring sectors. In both cases, the two outer radial side edges 5c, 5d of the shaped elements 5a or of the lower surfaces 6, respectively, together form an acute interior angle β (see, e.g., FIG. 1), the vertex of which is oriented to the center 3 of the lid 1. Through this, the bisecting axes of the wedge or circular sector-shaped lower surfaces 6 are disposed radially, whereby it can be said that the wedge-shaped or circular sector-shaped lower surfaces 6 overlap one another and that the tip of a lower surface is covered by the lower surface, which is located higher. The same also applies accordingly for the legs S of the shaped elements 5b/beads W of the embodiment according to FIGS. 4 to 6.

Instead of the shapes of the lower surfaces 6 illustrated in the figures and, thus, of the shaped elements 5a, 5b, the underside 2 of the lid can also be divided in a different manner into individual, non-illustrated shaped elements or lower surfaces, respectively, which are shaped differently, whereby it is ensured that all of the lower surfaces are substantially equal and have an angle of inclination α that is substantially equal or increases towards the edge of the lid 1 and a drip off edge and/or at least one drip off tip at its lowest position. It is also advantageous, if the lower drip off edges 7 of the shaped elements are located on concentric circles of the underside of the lid 1.

The lid 1 can be of steel or glass, for example, and, in particular, of cast iron. In an exemplary embodiment, at least the underside of the lid 1 is provided with an enamel layer.

Figure 9:
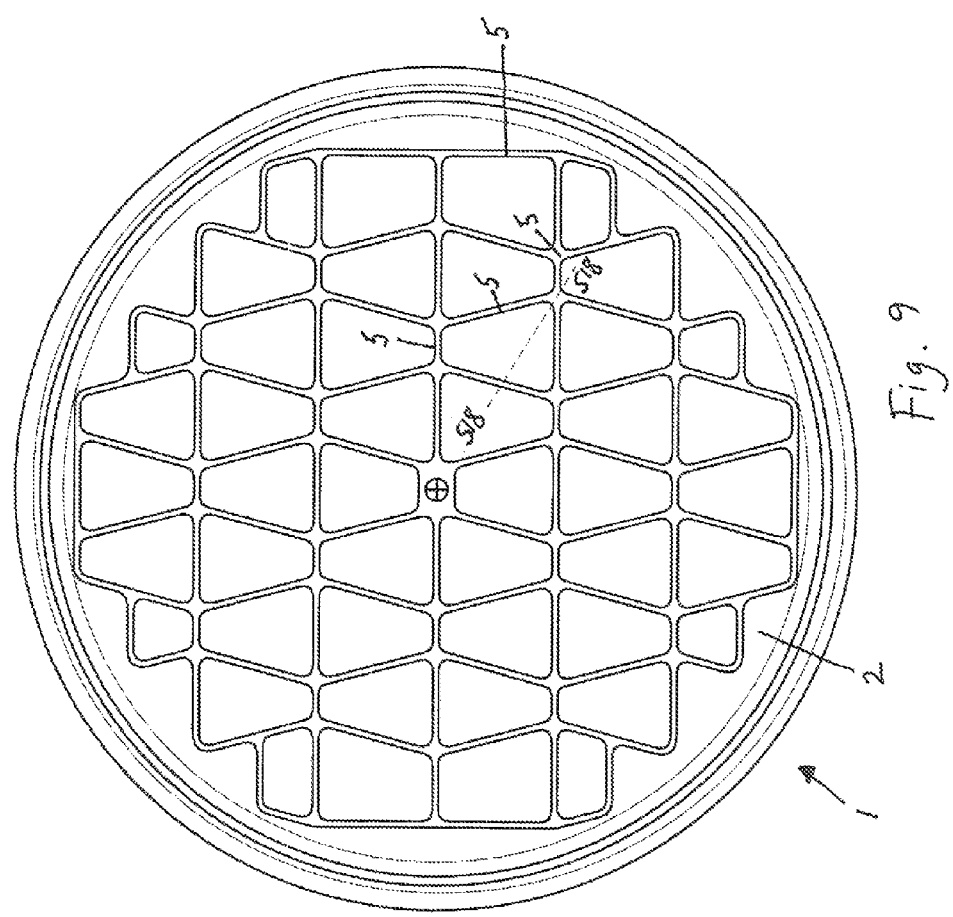
FIG. 9 is a bottom plan view of a fourth exemplary embodiment of a cooking vessel lid comprising trapezoidal shaped elements according to the invention.

Two further embodiments of the underside of the lid 1 according to the invention are illustrated in FIGS. 7 to 10. These further embodiments show that that shaped elements can encompass a wide variety of shapes, each shaped element respectively forms or borders a planar lower surface 6, which accumulates condensate and which slopes towards the edge 4 of the lid 1 and which leads to a drip off edge 7 at its lowest location.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A lid for a cooking vessel, comprising:
a lid base having:
an edge; and
an underside with a plurality of U-shaped elements arranged in concentric groupings around a center of the underside of the lid base, each of the plurality of shaped elements:
projecting downwards from the underside;
being one of flat and concavely curved;
having a lowest location at which is a drip off edge; and
respectively forming a planar lower surface that accumulates condensate, slopes towards the edge of the lid, and leads to the drip off edge.

2. The lid according to claim 1, wherein the shaped elements are distributed evenly about the underside of the lid.

3. The lid according to claim 1, wherein the drip off edges of the shaped elements are distributed evenly about the underside of the lid.

4. The lid according to claim 1, wherein the shaped elements are disposed at equal intervals in rows on concentric circular rings.

5. The lid according to claim 1, wherein the lower drip off edge of the shaped elements are located on concentric circles of the underside of the lid.

6. The lid according to claim 1, wherein:
the lid base has a center; and
the shaped elements have a wedge-shaped cross-section increasing from the center of the lid base radially outwards.

7. The lid according to claim 1, wherein:
at least the plurality of the shaped elements form or border a lower surface of substantially equal size; and
the lower surface accumulates condensate.

8. The lid according to claim 1, wherein the shaped elements are beads curved in a U-shaped and defining the lower surface that accumulates condensate.

9. The lid according to claim 8, wherein the beads encompass a substantially equal cross-section across their length.

10. The lid according to claim 1, wherein the lower surface encompasses an incline of between approximately 5 degrees to approximately 40 degrees.

11. The lid according to claim 1, wherein the lower surface encompasses an incline of between approximately 10 degrees to approximately 20 degrees.

12. The lid according to claim 1, wherein the lower surfaces of all of the shaped elements have the same angle of inclination.

13. The lid according to claim 1, wherein the lower surfaces of all of the shaped elements have a different angle of inclination.

14. The lid according to claim 1, wherein the lower surfaces encompass the shape of at least one of:
a wedge;
a circular sector; and
a circular ring sector comprising an acute interior angle.

15. The lid according to claim 14, wherein bisecting axes of one of the wedge-shaped lower surfaces and the circular sector-shaped lower surfaces are radially disposed.

16. The lid according to claim 14, wherein the one of the wedge-shaped lower surfaces and the circular sector-shaped lower surfaces overlap one another.

17. The lid according to claim 14, wherein the lower surfaces have tips and the tips are covered by another of the lower surfaces located higher on the underside of the lid.

18. The lid according to claim 1, wherein the lid base is of cast iron, steel, glass, or a combination thereof.

19. The lid according to claim 1, wherein at least the underside of the lid has an enamel layer.

20. The lid according to claim 1, wherein the lid is a cooking pot lid.

* * * * *